Figure 1:
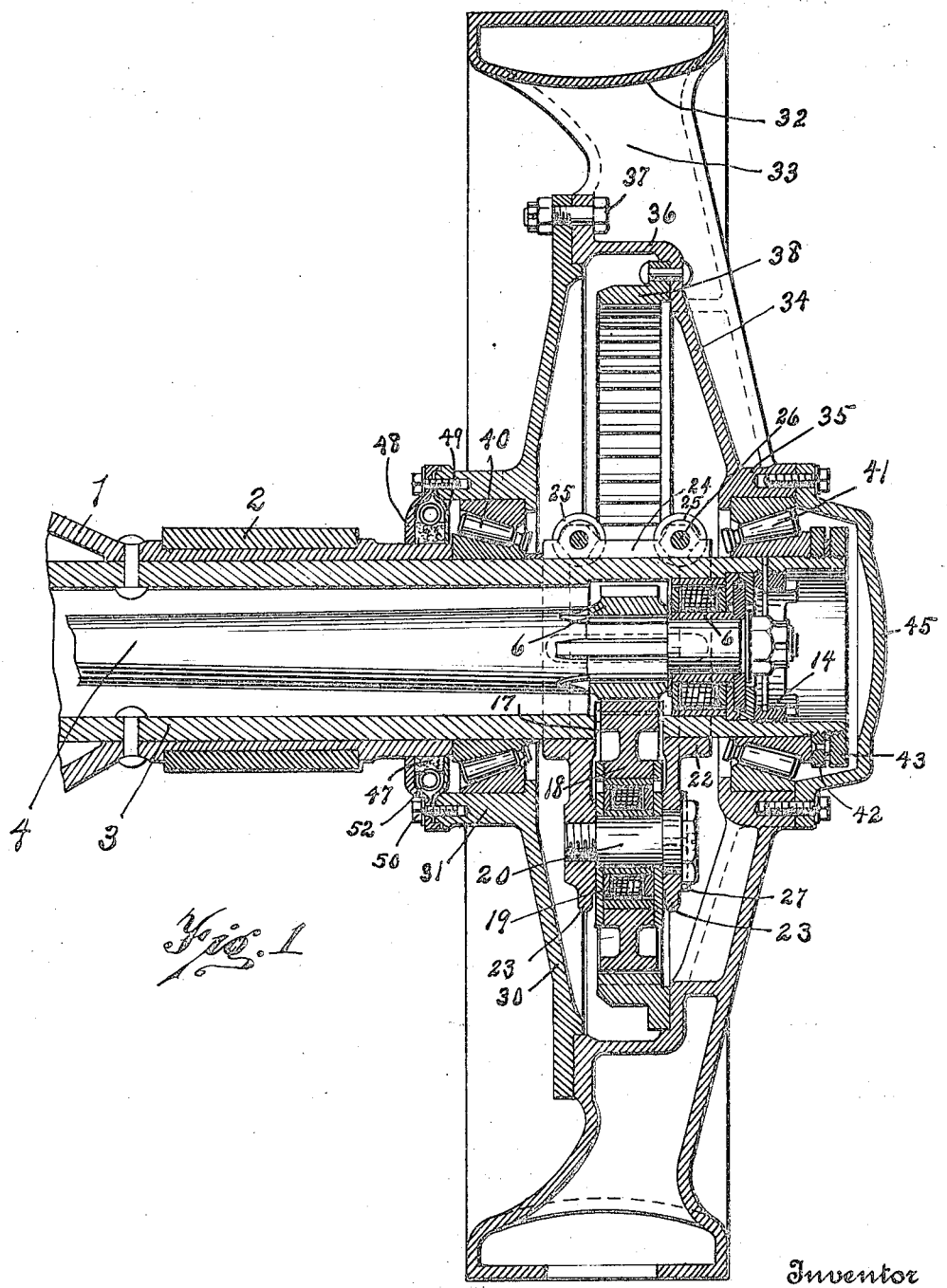

C. W. PARKER.
TRACTOR AXLE AND WHEEL.
APPLICATION FILED AUG. 20, 1919.

1,380,583.

Patented June 7, 1921.
3 SHEETS—SHEET 1.

Inventor
Clark W. Parker
By Edward N. Pagelsen
Attorney

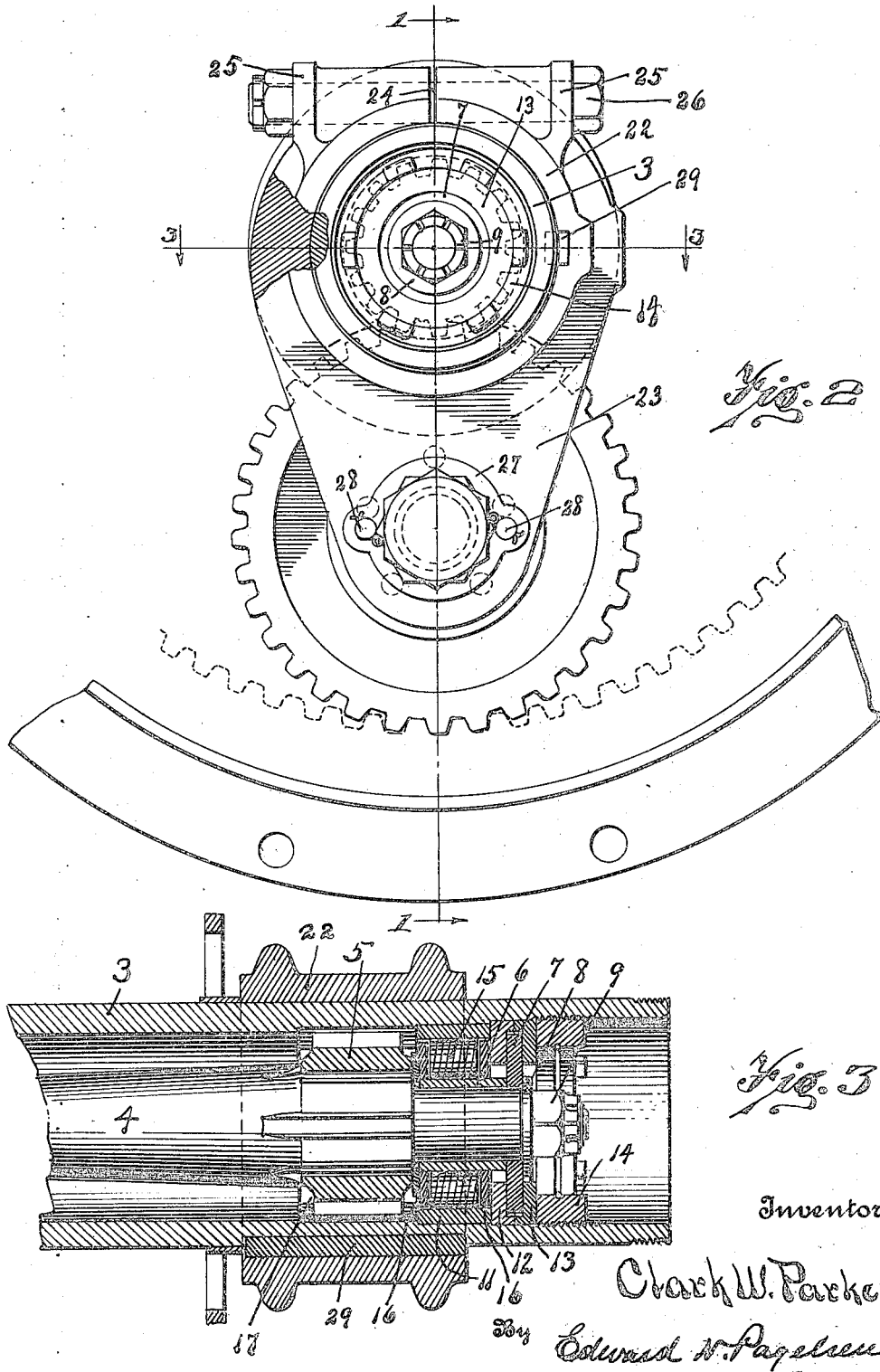

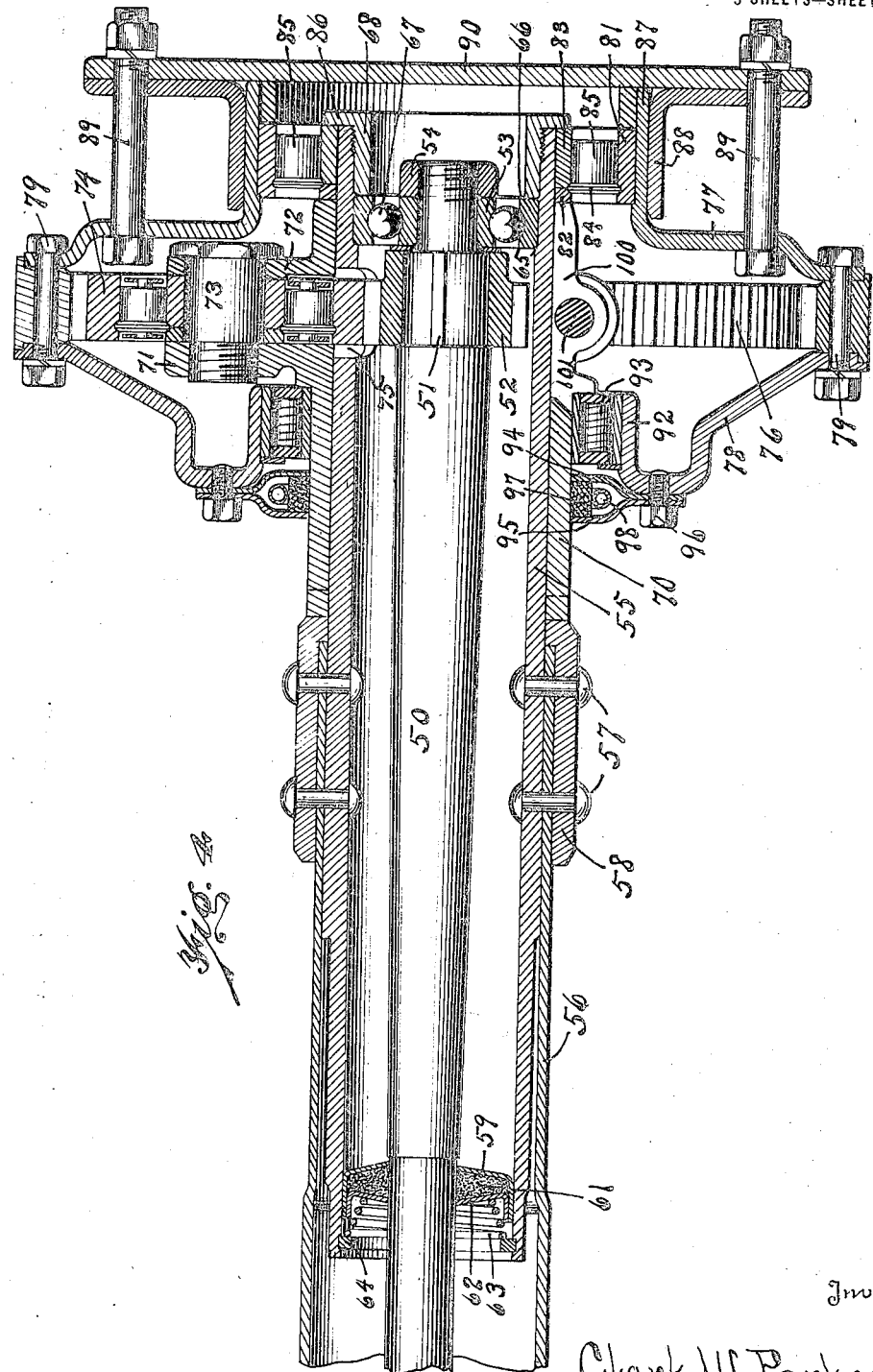

UNITED STATES PATENT OFFICE.

CLARK W. PARKER, OF NEW YORK, N. Y.

TRACTOR AXLE AND WHEEL.

1,380,583.   Specification of Letters Patent.   Patented June 7, 1921.

Application filed August 20, 1919. Serial No. 318,662.

*To all whom it may concern:*

Be it known that I, CLARK W. PARKER, a citizen of the United States, and residing at New York, in the county of New York and State of New York, have invented a new and Improved Tractor Axle and Wheel, of which the following is a specification.

This invention relates to the axles and tractor wheels of motor vehicles, especially motor trucks where unusual strength and rigidity are required, and its object is to provide an axle and a tractor wheel mounted thereon with a driving shaft and gearing which will be entirely inclosed within an oil receptacle, and which will permit of any of the parts being removed without disturbing the adjustment of any of the remaining parts of the axle structure.

This invention consists in a tubular axle and a tractor wheel having a divided hub journaled on the axle, a driving shaft extending through the axle, a driving pinion secured to said shaft and positioned between the two parts of the wheel hub, an idler gear carrier mounted on said axle which is provided with an opening through which the idler gear may extend so it may mesh with the pinion on the shaft, and an internal gear carried by the wheel and meshing with the idler gear.

It also consists in forming the sides and outer end of the hub of the tractor wheel oil tight and providing a casing for the axle, and mounting a rubbing or packing ring on an extension of the inner hub of the tractor wheel so as to prevent leakage from the oil receptacle.

It also consists in mounting a bearing for the outer end of the driving shaft within the outer end of the hollow axle.

It further consists in the details of construction illustrated in the accompanying drawings and particularly pointed out in the claims.

In the drawings, Figure 1 is a horizontal transverse section of a tractor wheel and the axle thereof on the line 1—1 of Fig. 2. Fig. 2 is an elevation of the idler gear carrier. Fig. 3 is a section on a larger scale of the end of the axle and shaft on the line 3—3 of Fig. 2. Fig. 4 is a section similar to Fig. 1 of a modified embodiment of this invention.

Similar reference characters refer to like parts throughout the several views.

The axle casing 1 may be provided with the usual saddle 2 for the springs and is secured to the strong tubular axle 3 in any desired manner. If desired, the casing may be omitted entirely. A section 4 of a two-part driving shaft extends from any desired type of differential gearing, not shown, to about the end of this axle. On this shaft is slidably secured a pinion 5, preferably held in position by the inner bearing sleeve 6 (see Fig. 3) the washers 7 and 8 and the nut 9. The outer bearing sleeve 11 is held in position by the two washers 12 and 13 between which the washer 7 is mounted to prevent endwise movement of the shaft, and by means of the threaded castellated ring 14. The usual rollers 15 are held in position by rings 16.

The axle is formed with an opening 17 in its wall to admit the idler gear 18 that meshes with the pinion 5. The idler is shown mounted on a roller bearing 19 and that on the pin 20 which is rigid with the idler gear carrier which consists of a sleeve 22 and two checks 23. The sleeve 22 is split at 24 and is provided with lugs 25 to receive the bolts 26 by means of which the carrier is secured to the axle. The strength of this idler carrier may be sufficient to entirely replace the strength lost by cutting the opening 17 in the axle. The lock-plate 27 may be secured to the idler carrier by the pins 28 to prevent the pin 20 from turning. The idler carrier may be positioned on the axle by means of a key 29. The angular position of the idler relative to the horizontal is immaterial.

A tractor wheel is mounted on the end of the axle and preferably comprises a convex inner disk 30 having a hub 31, and an outer portion consisting of the hollow rim 32, spokes 33, a convex irregular central plate 34 having a hub 35 and an intermediate ring 36 which connects to the inner disk 30 by means of bolts 37. To this ring 36 is secured an internally toothed ring 38 which meshes with the idler gear 18.

The roller bearing 40 supports the inner hub 31 and the outer hub 35 is supported by the bearing 41. The thrust of the bearing 40 may be taken by the end of axle casing 1, while the jam nuts 42 and 43 prevent the endwise movement of the outer bearing 41. A hub cap 45 is attached to the hub in any desired manner. As there is no overhang of the wheel, the support of the load on the axle is very rigid, this structure having all the stiffness of a direct drive.

The interior of the tractor wheel constitutes a receptacle for lubricant which submerges the idler and from which lubricant will be caused to flow to the bearings 40 and 41. Lubricant will also fill the interior of the axle and the bearing supported in the end thereof. Leakage is prevented by the packing ring 47 of felt or similar material held between the metal rings 48 and 49 which are secured to the end of the hub 31 by means of screws 50. A coil spring 52 bent around the packing ring and having its ends connected supplies the necessary pressure between the packing and the axle to hold back the lubricant.

The size of the axle casing need be no greater in the present case than those now in use for trucks of the same capacity, and as the shaft 4 runs at high speed, the differential gearing may be made quite small and the road clearance increased in proportion.

In the structure shown in Fig. 4, the shaft 50 is provided with a key 51 to drive the pinion 52, this being held in place on the shaft by the inner bearing ring 53 and the nut 54. The axle tube 55 is secured within the casing 56 by means of the rivets 57, a reinforcing ring 58 being employed if desired. At the inner end of the tube 55 is a packing cup 59 rigidly secured to the tube, a packing ring 61, a follower 62, a spring 63 and a spring anchor ring 64 to resist the thrust of the spring. The outer end of the tube is formed with a shoulder 65 to receive the outer bearing ring 66, between which and the ring 53 are the balls 67. The ring 66 and the shaft 50 are positioned by the collar 68.

Mounted on the tube 55 is a sleeve 70 having cheeks 71 and 72 which receive the pin 73 on which the idler gear 74 is mounted. The tube 55 has a notch 75 between the cheeks to permit the idler to engage the pinion 52. The idler also engages the internal teeth of the ring 76 which is connected to the two parts 77 and 78 of the wheel hub by means of the bolts 79.

The outer part 77 of the hub receives the outer bearing ring 81, the inner ring being in two parts 82 and 83 with a groove between them to receive the circumferential ridges 84 on the bearing rollers 85. The inner ring is secured in position by means of the flange 86 on the collar 68. The cylindrical extension 87 of this part 77 of the hub fits tightly into the retaining ring 88 for the spokes, not shown, this ring being secured to the part 77 by means of the bolts 89, which also secure the plate 90 against this retaining ring to hold in the lubricant.

The inner plate 78 of the hub has an inturned central flange 92 between which and the sleeve 70 is the bearing 93 of any desired character, a roller bearing being shown. As the bearing rollers 85 are substantially central with the spokes, the load on the bearing 93 will be quite small. Two sheet metal rings 94 and 95 may be secured to the part 79 by the screws 96, and the packing ring 97 between them will be held against the sleeve 70 by means of a continuous coil spring 98. This packing ring 97, the first described packing ring 61 and the hub plate 90 will prevent lubricant from escaping from the interior of the hub.

To secure the sleeve 70 to the tube 55, I prefer to form this sleeve with a longitudinal slot 100 diagonally opposite the pin 73 and to use a bolt 101 to draw the split end of the sleeve firmly around the tube 55, in substantially the same manner as illustrated in Fig. 2. This structure shown in Fig. 4 is especially adapted for light trucks and passenger vehicles, while that shown in Fig. 1 may be employed for the heaviest kind of trucks.

The details and proportions of the various parts may all be changed by automotive engineers without departing from the spirit of my invention as set forth in the following claims.

I claim:

1. In a vehicle, the combination of a casing, a tubular axle of substantially uniform external diameter throughout its length mounted in one end of the axle casing and having an opening near its end, a tractor wheel hub rotatable on the axle and having a hub in two spaced sections, one on either side of the opening in the axle, a driving shaft within the axle, a pinion on the shaft at the opening in the axle, an idler gear extending into the opening in the tubular axle and meshing with said pinion, a pin on which said idler gear is mounted, a supporting device for said pin clamped on said axle, and an internal gear connected to the wheel hub and meshing with said idler gear.

2. In a vehicle, the combination of a casing, a tubular axle of substantially uniform external diameter throughout its length mounted in one end of the axle casing and having an opening near its end, a tractor wheel hub rotatable on the axle and having a hub in two spaced sections, one on either side of the opening in the axle, a driving shaft within the axle, a pinion on the shaft at the opening in the axle, an idler gear extending into the opening in the tubular axle and meshing with said pinion, a pin on which said idler gear is mounted, a supporting device for said pin clamped on said axle to reinforce the tubular axle in the zone of the opening, and an internal gear connected to the wheel hub and meshing with said idler gear.

3. In a vehicle, the combination of a casing, a tubular axle of substantially uniform external diameter throughout its length mounted in one end of the axle casing and having an opening near its end, a tractor wheel hub rotatable on the axle and having a hub in two spaced sections, one on either side of the opening in the axle, a driving shaft within the axle, a pinion on the shaft at the opening in the axle, an idler gear extending into the opening in the tubular axle and meshing with said pinion, a pin on which said idler gear is mounted, a supporting device for said pin clamped on said axle, an internal gear connected to the wheel hub and meshing with said idler gear, and a bearing for the outer end of the shaft mounted within the end of the tubular axle.

CLARK W. PARKER.